Patented Aug. 30, 1949

2,480,639

UNITED STATES PATENT OFFICE 2,480,639

PREPARATION OF CARBON DISULFIDE

Robert P. Ferguson, Cranford, N. J., assignor to Standard Oil Development Company, a corporation of Delaware Application July 3, 1947, Serial No. 758,853

6 Claims. (Cl. 23—206)

This invention relates to an improved process for the preparation of carbon disulfide. More particularly, the invention relates to a process for the preparation of carbon disulfide by reaction between carbon and sulfur employing the fluid solids technique.

It is therefore an object of this invention to prepare carbon disulfide by reacting carbon with sulfur under proper conditions employing the fluid solids technique. It is a further object of this invention to economize heat in promoting the reaction between carbon and sulfur to form carbon disulfide.

Carbon disulfide is manufactured by the direct combination of carbon and sulfur at elevated temperatures in which the reaction takes place according to the equation:

$$C + 2S \rightarrow CS_2$$

Carbon combines with sulfur according to this equation with the absorption of heat equivalent to about 52,000 B. t. u. per 100 lbs. of carbon disulfide formed. Since the reaction is endothermic, heat must be supplied from an outside source to promote and maintain an efficient continuous process. At present this is accomplished by striking an electric arc between carbon electrodes placed in a mixture of coke and sulfur and, due to the quantities or electric current required, this operation is relatively expensive.

In my copending application, U. S. Serial No. 478,310 filed March 6, 1943, now U. S. Patent 2,443,854, issued June 22, 1948, there is disclosed an improved process whereby heat for the reaction is supplied by combustion of a portion of the fluidized coke and the reaction is carried out by contacting the finely divided hot coke with a stream of sulfur under conditions whereby the carbon is fluidized in the sulphur vapor in the reaction zone. By supplying heat through the combustion of the coke or other finely divided carbonaceous material, operating costs are decreased, the operation is made continuous, and close control of operating conditions is made possible due to intimate contact of the reactants when fluidizing the solid component in the gaseous component.

It has now been found that closer control of temperature conditions and improved heat economy can be effected in the process wherein carbon disulfide is produced by reaction carbon and sulfur under conditions whereby the carbon is fluidized in a stream of sulfur vapor within the reaction zone by feeding an excess of finely divided carbon to the reaction zone, recovering excess unreacted hot carbon from the reaction zone and recirculating the same to the carbon preheating stage to supply heat for the fresh carbon feed.

The inventa will be more fully understood from the following description according to the drawings.

Figure 1:
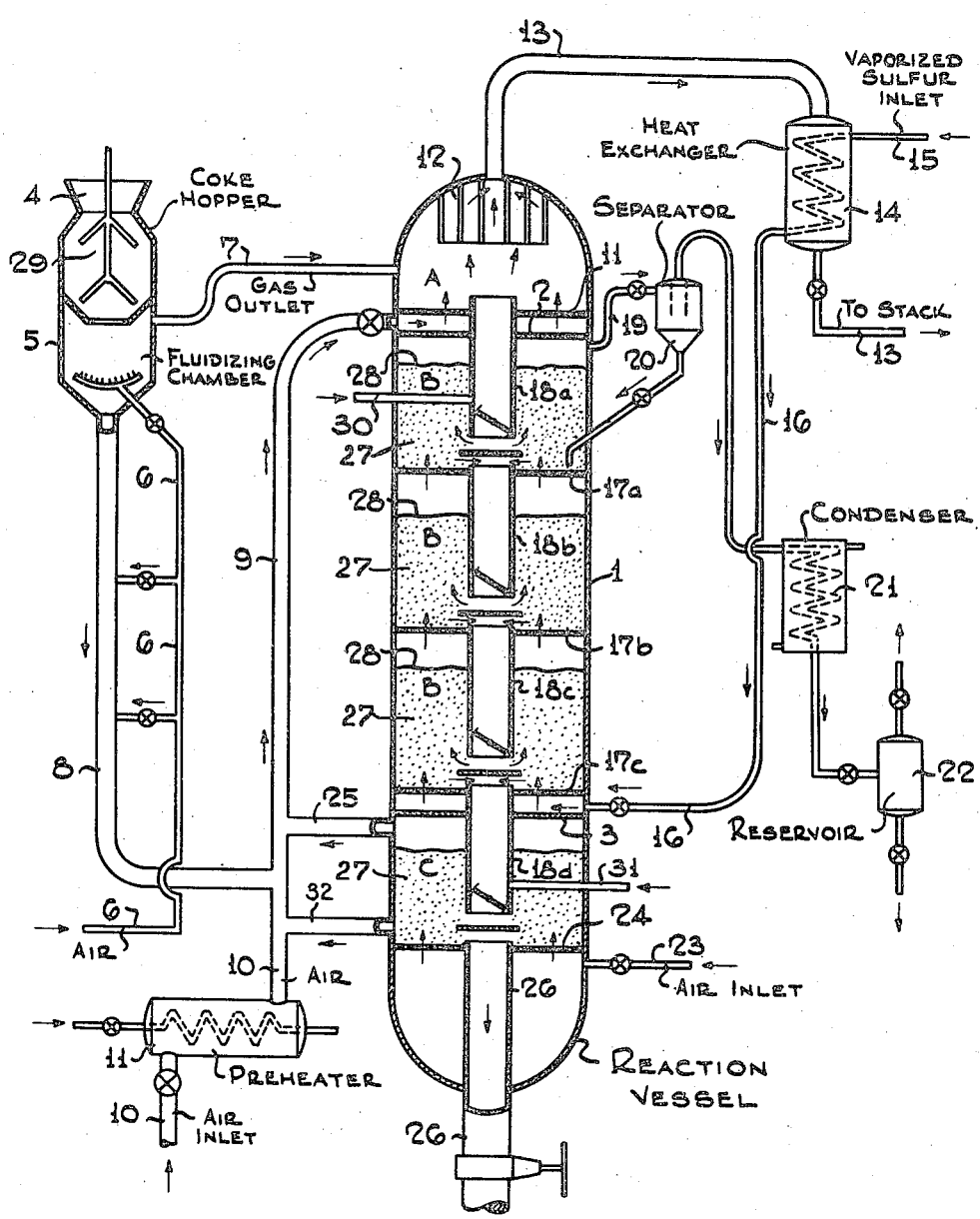
Figure 1 is a semi-diagrammatic view in sectional elevation of an apparatus suitable for producing carbon disulfide by an improved method whereby economy of heat is assured.

Referring to Figure 1, numeral 1 denotes a reaction vessel, preferably in a cylindrical form, which is divided into three separate zones, an upper heating zone marked A, a middle or reaction zone, B, which may be in one or several reaction sections, as will be described later, and a lower preheating zone C. These zones are separated from each other by solid cross-sectional plates 2 and 3, zones A and B by the plate 2, and B and C by the plate 3. Powdered coke is fed into an elevated hopper 4 through a double bell valve 29, into a dispersing or fluidizing chamber 5. Air or other gas is added at the bottom of the zone through the pipe 6 and a dense suspension of the finely divided coke in the gas is thus prepared in 5. Some gas is released through pipe 7, preferably to equipment for recovery of the finely divided carbon. This may be a separate device or the pipe 7 may be connected into the top of the zone A, as will be explained below.

The dense dispersion of coke or other finely divided carbonaceous material in gas is conveniently described as being in a "fluidized" condition since the mixture acts in many ways like a liquid and is capable of flowing through pipes, valves, chambers and conduits, and shows both static and dynamic heads. The fluidized coke from the chamber 5 passes down through feeding standpipe 8 and into a rising pipe 9, which leads directly into the zone A of the reactor. Air is supplied by a pipe 10 and it is preferably preheated at 11 before it passes into the pipe 9. If desired, it may pass directly into the zone A, that is before admixture with the fluidized coke. The air is insufficient for the complete combustion of the entire amount of coke fed, but is sufficient to burn enough coke to raise the remainder of the fluidized mixture to an elevated temperature of the order of 1100° F. to about 2000° F., preferably 1450–1650° F. Temperatures above 2000° F. are to be avoided with high ash content carbons due to the tendency of the carbons to slag at these temperatures. It has been estimated that for every 12 lbs. of carbon reacted with sulfur according to equation set out above, approximately 1 lb. of carbon must be burned to supply the necessary heat of reaction plus that required to make up for heat losses.

Reaction vessel 1 may be lined with firebrick, not shown, or otherwise adapted to withstand this high temperature and the mixture of air and solid gas is added at the bottom of the zone A, preferably beneath a grid or screen 11, which acts as a distributor. Thus, within the zone A, the finely divided coke in a highly heated condition is fluidized in the combustion gas. From the top of the zone the combustion gas is removed through a cyclone separator 12 which is finely constructed in the top of the zone A. Clean gas is taken by pipe 13 to a heat exchanger 14 and thence to a stack which is not shown. The efficiency of the cyclone separator may be so regulated that ash particles which will be lighter or smaller in size than the carbon may be allowed to pass overhead with the combustion gases. These ash particles, termed "fly ash," are allowed to pass along with the combustion gases as a heat exchange medium.

Vaporized sulfur is supplied through a pipe 15 and is carried through the heater 14 wherein it is highly superheated before passing by a pipe 16 into the lower portion of zone B of the reactor 1. The zone B may be a single zone or may be divided, as indicated above, into a series of reaction sections by means of grids marked 17. In this case three such sections and three grids 17a, 17b and 17c are shown, but it will be understood that one, two, or more than three sections may be employed. The sections may be graduated in size if desired. The pulverized, fluidized coke is fed into the uppermost section of zone B directly from zone A by means of a pipe 18a, which passes through the grid 11 and through the septum 2. This pipe, 18a, discharges into the uppermost section of zone B and preferably there is some dispersing plate or baffling means to give the dispersion an upward motion into the zone. From the uppermost section the fluidized coke passes downwardly to the lower sections successively by pipes 18b and 18c and then from the lowermost section into zone C of the reactor by a pipe 18d. It will thus be seen that the fluidized carbon flows down through the several sections of zone B in a roughly countercurrent relation to the vaporized sulfur which passes upwardly through the several sections of zone B.

The flow of carbon downwardly into the successive zones of the vessel B and the flow of sulfur vapor upwardly through the zones of the vessel B are so regulated as to form in each of the sections B a definite level of carbon fluidized in sulfur vapor. This level is shown in each zone by numeral 28. In each zone identified as B the carbon and sulfur are present in the form of a dense, highly turbulent phase resembling a boiling liquid. A velocity of sulfur vapor through the carbon bed of approximately 0.5 to 5 ft. per sec. is sufficient to maintain such a dense phase in each section of the reaction zone.

The conversion to carbon disulfide occurs during the passage through the several sections of zone B, and, as the temperature is considerably above the boiling point of carbon disulfide, the vapor of that compound as it is formed passes up through zone B, finally finding exit by pipe 19 which preferably connects with a hot dust separator 20 which returns finely divided coke dust to zone B. The carbon disulfide vapor is then condensed in a cooler 21 and is collected in a reservoir 22.

The powdered solid consisting of excess unreacted hot carbon with a small amount of finely divided ash leaves the lower section of zone B by means of a pipe 18d and enters zone C. This material is still at a high temperature so that it is desirable to recover the heat therefrom. This may be accomplished by picking up the hot carbon by means of air fed with sufficient velocity through the pipe 23 beneath the grid 24 within the zone C and recirculating it in a fluidized condition into overflow line 25 and through pipes 10 and 9 where it meets fresh fluidized carbon feed supplying heat thereto. By controlling the amount of air through bed 27 in zone C any required amount of hot carbon can be recycled in order to maintain the desired temperature in the reaction zone.

During the continuous process a small amount of ash may build up in the zone C with the unreacted carbon. Build-up of the ash may be prevented by periodically withdrawing a portion of material from zone C through line 26. This portion may be discarded or treated for recovery of carbon and ash. It should be realized however, that the ash itself is an excellent heat carrying medium and no harmful effect is produced by circulating it through the reaction zone as a heat carrying solid via lines 25, 32 and 9.

It will be understood that the solids throughout the entire process are in what has been termed a "fluidized" state and the streams flow downwardly from zone to zone while the sulfur vapors gradually pass upward through the apparatus. Within the reaction zones the finely divided carbon and the vaporized sulfur are as thoroughly admixed as possible and in continual agitation so that the reaction proceeds rapidly and efficiently. Within each of the sections B, the agitation is sufficiently great so that each section will be held at approximately the same temperature. The flow down the pipes marked 18 is controlled by dampers or other types of valves which are shown on the drawing.

In order to maintain the solid in a thoroughly fluidized state, it must be reduced to a fine powder, preferably not greater than 50 mesh, and it is usual to employ powders of say 100 to 200 mesh or even finer. Gas must be added to these powders in a certain minimum quantity of the order of 1 to 2 cubic feet per 100 pounds of solid in order to effect the fluidization. If less gas be present, the solid will have a tendency to pack and will not flow through the apparatus smoothly, but if a good fluidized suspension is obtained and velocities are kept within prescribed limits, there is little tendency for the solids to pack and to plug valves or lines. Quantities of gas, considerably greater than the minimum specified above, can be added to the suspensions without undesirable effects and flow of the fluidized suspensions can be effected without the use of pumps or fans acting directly on the powdered solid by conveniently adjusting the densities of the suspensions. Thus, the density in the down pipe 8, which conducts the original fluidized carbon from the chamber 5, will be considerably greater than the density of the suspension in the rising pipe 9, because of the gas added to pipe 9 by 10, so that the fluidized suspension prepared in the chamber 5 will be conducted down the pipe 8 and up through the pipe 9 without the use of pumps or fans as indicated above.

In a process for the preparation of carbon disulfide as described above, it is important to prevent contamination of streams in the reaction zone B by gases or vapors entrained with the carbon transferred between zones of the reactor such as 18a, 18b, etc. For example, in Figure 1, air and carbon oxides entrained with carbon passing downwardly through zone 18a lead to the formation of carbon oxysulfide in the top of zone B, particularly at temperatures below 2000° F. Air and carbon oxides are therefore stripped from the carbon in zone 18a by the use of an inert purging gas entering the system through line 30. Nitrogen or other inert gas which would not react with the constituents present to give harmful products such as carbon oxysulfide, may be employed as the purging gas. This purge gas, of course, also acts as a fluidizing gas. It is removed from the system through line 13 and overhead from reservoir 22.

Similarly in zone C, sulfur and carbon disulfide vapors may become entrained with carbon passing downwardly through 18d. The presence of sulfur in carbon disulfide vapors in 18d would lead to subsequent loss of sulfur and carbon disulfide in the combustion gases flowing through lines 25, 28 and 9 to stack 13. In zone C sulfur and carbon disulfide vapors are stripped from the downwardly flowing carbon by inert purge gas entering 18d through line 31. This fluidizing and purge gas may be nitrogen or other inert gas which would not react with the constituents present to give harmful products such as carbon oxysulfide etc.

The velocity of flow within the tower is an important factor and preferably should be held within the range of 0.5 to 5 cu. ft. per sec., that is to say, the upward flow of gas based on the total diameter of the reaction zone. This is sufficient to maintain the suspension and to bring about the desired agitation. If the velocity is much above this figure, the amount of fluidized carbon carried overhead is considerably increased and while this is not greatly objectionable, it requires larger dust separating capacity than is required with the velocities set forth. The temperature within the reaction zone is within the range of 1100° F. to 2000° F., preferably 1450–1650° F. It will, of course, be understood that the reaction itself proceeds in the same general manner as is known for the reaction of carbon with sulfur to form carbon disulfide, but more rapidly in the present case because of the finely divided condition of the coke.

It should be noted from the foregoing description that heat economy in the endothermic reaction between carbon and sulfur is affected by continuously recirculating hot unreacted finely divided carbon between the reaction zone and the carbon preheating zone, and while it is realized that reaction heat may be supplied to a reaction vessel by circulation and recirculation of hot solids therethrough, in this process the circulating solid is a reactant material itself. Thus, the carbon acts as a reactant and at the same time further functions as a means of supplying heat to the reaction chamber.

Figure 2:
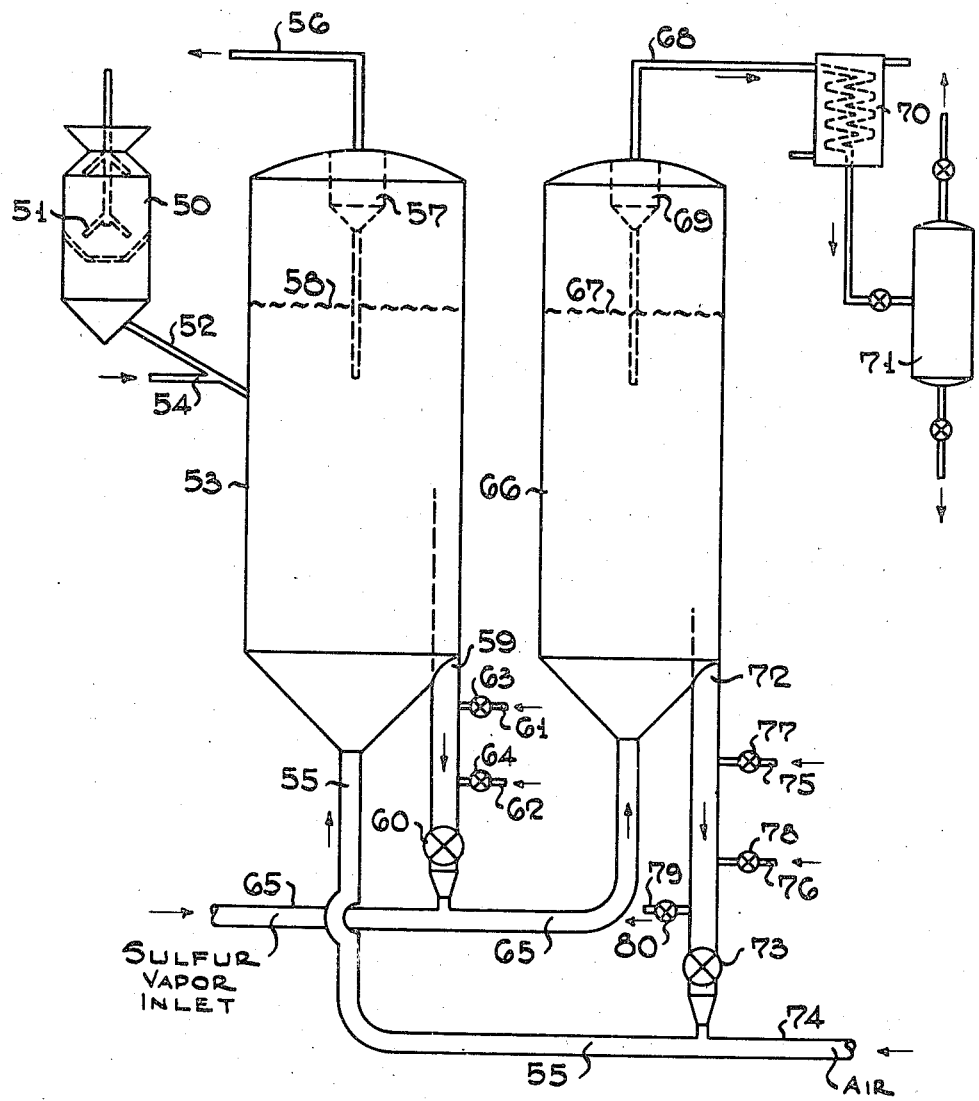
Figure 2 is a semi-diagrammatic view in sectional elevation of an alternative apparatus for carrying out the desired reaction between carbon and sulfur to form carbon disulfide.

Figure 2 represents another modification of the invention in which finely divided carbon is supplied to a carbon hopper 50 provided with a double bell valve 51. From the hopper the carbon passes through line 52 into a carbon preheater 53 with the aid of air or other inert gas to avoid clogging supplied through line 54. The carbon collects in vessel 53 and is burned to incandescence therein by means of combustion with air or other gaseous fuel supplied through line 55. Combustion gases are withdrawn through line 56 and may be used to preheat the carbon or air entering vessel 53 by means of lines 52 and 54, respectively. Any carbon fines are separated from the combustion gases and returned to the vessel 53 by means of internal cyclone separator 57. The efficiency of the cyclone separator may be so regulated that ash particles which will be lighter or smaller in size than the carbon may be allowed to pass overhead with the combustion gases. These ash particles, termed "fly ash," are allowed to pass along with the combustion gases as a heat exchange medium. A bed of dense phase incandescent carbon, highly turbulent and fluidized, is maintained in vessel 53 and this level of this bed is indicated by line 58. The highly turbulent bed is maintained by regulating the velocity of flow within the vessel 53. An upward velocity of flow of fluidizing gas, e. g. combustion gas, air, etc. in the range of 0.5 to 5 cu. ft. per sec., i. e. the upward flow of gas based on total diameter of the vessel, is sufficient to maintain the suspension in a fluidized highly turbulent dense phase. The fluid incandescent carbon, at a temperature within the range of 1600–2000° F., is removed from vessel 53 by means of pipe 59 provided with valve 60. Pipe 59 is provided with inlets 61 and 62 equipped with valves 63 and 64 for controlled admission of gas serving both as a purge and as a fluidizing medium. The admission of inert gas at these points prevents packing or clogging within the pipe. At the same time, the fluidizing gas is used in amounts so as to serve as a purge preventing gaseous combustion products from entering line 59 with hot solids emerging from the combustion zone. In this manner, air and oxides of carbon which would react harmfully with sulfur vapor entering line 65, are kept from entering the reaction zone 66. This fluidizing and purge gas may be nitrogen or other inert gas which would not react with the constituents present to give harmful products such as carbon oxysulfide etc. The hot finely divided carbon is allowed to pass down through pipe 59 and is picked up by a stream of sulfur vapor being pumped with sufficient velocity through line 65. The carbon is carried along in sulfur vapor through line 65 into reaction chamber 66 wherein a similar dense bed of incandescent carbon is maintained, fluidized by the sulfur vapor entering through line 65. The level of the dense phase is indicated by the line 67. Within the reaction vessel the temperature is maintained between 1100° F. and 2000° F., preferably 1450–1650° F., at which the reaction between carbon and sulfur proceeds smoothly. The carbon disulfide forms as a vapor and is removed from the reaction zone via line 68. Carbon fines are removed from the product and returned to reaction vessel by means of cyclone 69. The carbon disulfide vapor is condensed in condenser 70 and collected in a reservoir 71. Vessel 66 is provided with a pipe 72, provided with a valve 73, by means of which hot finely divided unreacted carbon is allowed to be withdrawn from the reaction vessel. This carbon is carried into pipe 55 by means of air entering with sufficient velocity through line 74. The air picks up the hot carbon, enters into heat exchange with it, and carries it into the carbon preheater 53 to supply heat thereto, part of the carbon being further burned by the air on its way to the preheater and within the preheater. Pipe 72 is provided with inlets 75 and 76 equipped with valves 77 and 78 for admission of inert fluidizing gas to prevent packing or clogging within the pipe. At the same time the fluidizing gas is used in amounts so as to serve as a purge preventing sulfur and carbon disulfide from being carried down pipe 72 into pipes 74 and 55 where they would contaminate the air for the combustion zone and subsequently be lost to stack 56. This fluidizing and purge gas may be nitrogen or other inert gas which would not react with the constituents present to give harmful products such as carbon oxysulfide etc.

With high purity carbons such as wood charcoal, etc., very little ash is formed. It is extremely light in density and passes off with combustion gases or with the product stream without producing deleterious results. When high ash content carbonaceous materials are employed as the source of carbon, the ash produced, although not too great, will build up within the system after a period of operation. In this case the ash may be removed by a cyclone separator inserted in line 68 or it may be removed as bottoms periodically with some carbon through line 79 controlled by valve 80. However, it should be remembered that carbonaceous materials which possess a tendency to slag should not preferably be employed at high temperatures such as prevail in the reaction zone. Under no circumstances should temperatures above 2000° F. be employed with carbonaceous materials which possess slagging tendencies.

With regard to the temperature employed in the process described, it has been found that the reaction proceeds smoothly in the range of 1450° F. to 1650° F. However, it has also been found that with highly reactive carbons such as steam-activated wood charcoal, the reaction temperature may be reduced and the reaction proceeds smoothly at 1100° F. to 1400° F. With regard to the upper temperature limits, temperatures above 2000° F. may be used. However, with extremely high temperatures, it has been found that undesirable and less stable compounds formed during the reaction decompose and contaminate the products. High temperatures should be avoided because they impose an undue burden on the equipment, make necessary the employment of more efficient condensing apparatus and, as above stated, cause contamination of the product with decomposition of compounds resulting as by-products of the reaction. Temperatures as high as 2400° F. have been found to give no additional beneficial results, in fact, a slight decrease in conversion results.

Having described the invention in terms so that it may be practiced by those skilled in the art, what is claimed is:

1. In a continuous process for the production of carbon disulfide by the reaction between carbon and sulfur whereby carbon is fluidized in and caused to react with sulfur vapor under reaction conditions in a reaction zone, the improvement which comprises removing unreacted hot carbon from the reaction zone and recirculating the same to preheat fresh carbon entering the reaction zone.

2. In a continuous process for the production of carbon disulfide by the reaction between carbon and sulfur whereby carbon is fluidized in and caused to react with sulfur vapor under reaction conditions in a reaction zone, the improvement which comprises continuously feeding excess carbon over that required to react with the sulfur to the reaction zone, continuously removing the excess hot unreacted carbon from the reaction zone and recirculating it to preheat fresh carbon entering the reaction zone.

3. In a continuous process for the production of carbon disulfide by the reaction between carbon and sulfur wherein carbon is fluidized in and caused to react with sulfur vapors in a reaction zone under reaction conditions and wherein the heat for the reaction is supplied by combustion in a combustion zone of part of the carbon feed to the reaction zone, the improvement which comprises removing unreacted hot carbon from the reaction zone and recirculating it in a fluidized condition to the combustion zone to supply heat thereto.

4. In a continuous process for the production of carbon disulfide by the reaction between carbon and sulfur wherein carbon is fluidized in and caused to react with sulfur vapors in a reaction zone under reaction conditions and wherein the heat for the reaction is supplied by combustion in a combustion zone of part of the carbon feed to the reaction zone, the improvement which comprises continuously feeding excess carbon over that required to react with the sulfur to the reaction zone, continuously removing excess hot unreacted carbon from the reaction zone and recirculating it in a fluidized condition to the combustion zone to supply heat thereto.

5. A continuous process for the production of carbon disulfide by reaction between carbon and sulfur which comprises continuously maintaining a dense highly turbulent bed of hot fluidized carbon in a preheating zone, continuously removing a stream of hot fluidized carbon from the bottom of the preheating zone, continuously contacting the stream of hot fluidized carbon with a stream of sulfur vapor in a reaction zone wherein the hot carbon is fluidized in the sulfur vapor and wherein the fluidized mass is maintained in a dense turbulent bed under reaction conditions, withdrawing carbon disulfide as vapors overhead from the reaction zone, continuously withdrawing hot fluidized unreacted carbon from the bottom of the reaction zone and continuously recirculating the hot unreacted fluidized carbon to the preheating zone to supply heat thereto.

6. A continuous process for the production of carbon disulfide by reaction between carbon and sulfur which comprises continuously maintaining a dense highly turbulent bed of hot fluidized carbon in a preheating zone at a temperature between approximately 1600° F. and 2000° F., continuously removing a stream of hot fluidized carbon from the bottom of the preheating zone, continuously contacting the stream of hot fluidized carbon with a stream of sulfur vapor in a reaction zone wherein the hot carbon is fluidized in the sulfur vapor and wherein the fluidized mass is maintained in a dense turbulent bed at approximately 1450° F.–1650° F., withdrawing carbon disulfide as vapors overhead from the reaction zone, continuously withdrawing hot fluidized unreacted carbon from the bottom of the reaction zone and continuously recirculating the hot unreacted fluidized carbon to the preheating zone to supply heat thereto.

ROBERT P. FERGUSON.

REFERENCES CITED

The following references are of record in the file of this patent:

UNITED STATES PATENTS

| Number | Name | Date |
|---|---|---|
| 2,443,854 | Ferguson | June 22, 1948 |